(12) United States Patent
Iwadate et al.

(10) Patent No.: US 12,281,201 B2
(45) Date of Patent: Apr. 22, 2025

(54) POLYARYLENE ETHER KETONE RESIN, PRODUCTION METHOD THEREOF, AND MOLDED PRODUCT

(71) Applicant: DIC Corporation, Tokyo (JP)

(72) Inventors: Noriyuki Iwadate, Sakura (JP); Naoto Yagi, Sakura (JP)

(73) Assignee: DIC CORPORATION, Tokyo (JP)

( * ) Notice: Subject to any disclaimer, the term of this patent is extended or adjusted under 35 U.S.C. 154(b) by 784 days.

(21) Appl. No.: 17/607,094

(22) PCT Filed: Jun. 8, 2020

(86) PCT No.: PCT/JP2020/022462
§ 371 (c)(1),
(2) Date: Oct. 28, 2021

(87) PCT Pub. No.: WO2021/014800
PCT Pub. Date: Jan. 28, 2021

(65) Prior Publication Data
US 2022/0119594 A1    Apr. 21, 2022

(30) Foreign Application Priority Data

Jul. 24, 2019   (JP) .................................. 2019-136053

(51) Int. Cl.
*C08G 65/40*  (2006.01)
*C08G 67/00*  (2006.01)
*C08L 71/12*  (2006.01)

(52) U.S. Cl.
CPC .......... *C08G 65/4012* (2013.01); *C08G 67/00* (2013.01); *C08L 71/12* (2013.01); *C08G 2650/40* (2013.01); *C08L 2201/08* (2013.01); *C08L 2203/12* (2013.01); *C08L 2203/16* (2013.01); *C08L 2203/20* (2013.01); *C08L 2203/30* (2013.01)

(58) Field of Classification Search
CPC ................ C08G 65/4012; C08G 67/00; C08G 2650/40; C08L 71/12
See application file for complete search history.

(56) References Cited

U.S. PATENT DOCUMENTS

| | | |
|---|---|---|
| 3,065,205 A | 11/1962 | Bonner et al. |
| 3,953,400 A | 4/1976 | Dahl |
| 4,320,224 A | 3/1982 | Rose et al. |
| 4,820,794 A * | 4/1989 | Darnell ................ C08G 61/127 528/206 |
| 2003/0176635 A1 * | 9/2003 | Gharda .................. C08G 61/12 528/220 |

FOREIGN PATENT DOCUMENTS

JP   61-247731 A   11/1986

OTHER PUBLICATIONS

International Search Report dated Aug. 25, 2020, issued in counterpart International Application No. PCT/JP2020/022462 (2 pages).
Office Action dated Sep. 29, 2024, issued in counterpart KR Application No. 10-2021-7037079. (5 pages).

* cited by examiner

*Primary Examiner* — Marc S Zimmer
*Assistant Examiner* — Surbhi M Du
(74) *Attorney, Agent, or Firm* — WHDA, LLP

(57) ABSTRACT

A polyarylene ether ketone resin includes repeating units represented by general formulae (1-1), (2-1), and (3-1) below. (In the formula (1-1), m1 is an integer of any one of 1 to 3). (In the formula (2-1), m2 is an integer of any one of 1 to 3). (In the formula (3-1), n is an integer of any one of 0 to 2).

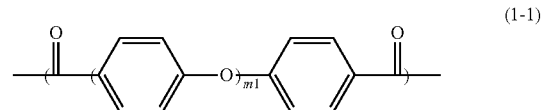

(1-1)

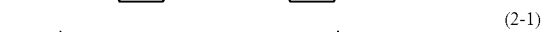

(2-1)

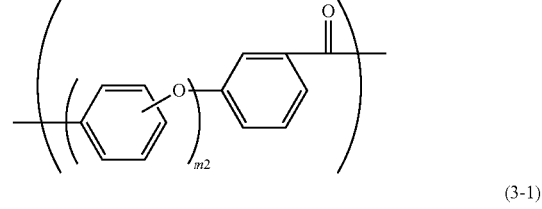

(3-1)

4 Claims, No Drawings

POLYARYLENE ETHER KETONE RESIN, PRODUCTION METHOD THEREOF, AND MOLDED PRODUCT

TECHNICAL FIELD

The present invention relates to a polyarylene ether ketone resin, a production method thereof, and a molded product.

BACKGROUND ART

A polyarylene ether ketone resin (may be abbreviated as a "PAEK resin" hereinafter) is widely used as a crystalline super engineering plastic, which has excellent heat resistance, chemical resistance, toughness, etc. and which can be continuously used at high temperature, for applications such as electric/electronic components, automotive components, medical components, fibers, and films.

In general, a polyether ether ketone resin (may be abbreviated as a "PEEK resin" hereinafter) is well known as the PAEK resin, and it has two ether groups and one ketone group in one repeating unit and is produced by nucleophilic aromatic substitution polymerization (refer to, for example, Patent Literature 1) of two monomers, 4,4'-difluorobenzophenone and hydroquinone, using potassium carbonate in diphenyl sulfone.

Also, there are a polyether ketone resin (may be abbreviated as a "PEK resin" hereinafter) produced by using 4,4'-dihydroxybenzophenon in place of hydroquinone, and having one each of an ether group and a ketone group in one repeating unit, and a polyether ketone ketone resin (may be abbreviated as a "PEKK resin" hereinafter) having one ether group and two ketone groups in one repeating unit.

However, the nucleophilic aromatic substitution polymerization used for producing these PAEK resins has the defects of high raw material cost due to the use of expensive 4,4'-difluorobenzophenone as a monomer and high production process cost due to the reaction temperature of 300° C. or more, and thus the resin cost tends to be increased.

Therefore, electrophilic aromatic substitution polymerization is known, in which a PAEK resin is produced under mild polymerization conditions without using 4,4'-difluorobenzophene as a monomer.

Examples of use of the electrophilic aromatic substitution polymerization include production of a PEK resin by a method of reacting 4-phenoxybenzoic acid chloride in the presence of hydrogen fluoride-boron trifluoride (for example, refer to Patent Literature 2), production of a PEKK resin by a method of reacting terephthalic acid chloride with diphenyl ether in the presence of a Lewis acid (for example, refer to Patent Literature 3), production of a PEK resin by a method of reacting 4-phenoxybenzoic acid in the presence of methanesulfonic acid and diphosphorus pentoxide (for example, refer to Patent Literature 4), and the like.

CITATION LIST

Patent Literature

PTL 1: Specification of U.S. Pat. No. 4,320,224
PTL 2: Specification of U.S. Pat. No. 3,953,400
PTL 3: Specification of U.S. Pat. No. 3,065,205
PTL 4: Japanese Unexamined Patent Application Publication No. 61-247731

SUMMARY OF INVENTION

Technical Problem

The usual PAEK resins such as the PEEK resin, PEK resin, PEKK resin, and the like described above are semicrystalline polymers and have high glass transition temperatures and excellent heat resistance, but high temperature and pressure are required for molding due to the high crystal melting points, thereby causing the defect of poor moldability.

Therefore, an object of the present invention is to provide a polyarylene ether ketone resin which has excellent heat resistance and a high glass transition temperature and which can be reduced in melting point and has good moldability and excellent impact resistance. Another object of the present invention is to provide a production method suitable for producing the polyarylene ether ketone resin.

Solution to Problem

It has been considered that super engineering plastics such as a PAEK resin and the like are preferably polymers having a uniform structure containing as small amounts of impurities as possible in order to realize high heat resistance. Therefore, a polymer having a single repeating unit has been mainly developed as the PAEK resin. However, a structure having a single repeating unit has difficulty in adjusting thermophysical properties such as a crystal melting point and the like and thus has difficulty in improving moldability.

As a result of repeated earnest investigations for solving the problem described above, the inventors found that a PAEK resin produced by copolymerizing a repeating unit (1-1) and a repeating unit (3-1) described below, which are rigid and tough components, with a repeating unit (2-1) described below, which is a flexible component, at a specific ratio can be reduced in crystal melting point and thus can exhibit good moldability and impact resistance, leading to the achievement of the present invention.

That is, the present invention has the following aspects.

[1] A polyarylene ether ketone resin having repeating units represented by general formulae (1-1), (2-1), and (3-1) below.

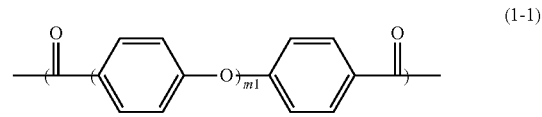
(1-1)

(In the formula, m1 is an integer of any one of 1 to 3.)

[Chem. 2]

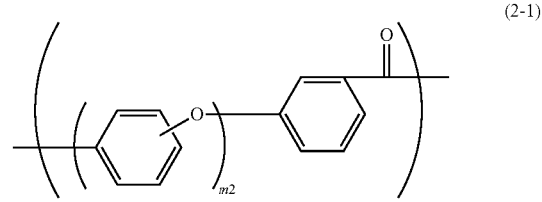
(2-1)

(In the formula, m2 is an integer of any one of 1 to 3.)

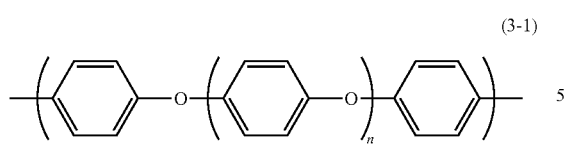

(3-1)

(In the formula, n is an integer of any one of 0 to 2.)

[2] The polyarylene ether ketone resin described above in [1], wherein the ratio, in terms of molar ratio, of the total molar amount of the repeating units (1-1) and (3-1) to the molar amount of the repeating unit (2-1) is within a range of 95:5 to 5:95.

[3] A method for producing the polyarylene ether ketone resin described above in [1] or [2], the method including reacting a monomer (1-2) represented by general formula (1-2) below, a monomer (2-2) represented by general formula (2-2) below, and a monomer (3-2) represented by general formula (3-2) below in the presence of organic sulfonic acid and diphosphorus pentoxide.

[Chem. 4]

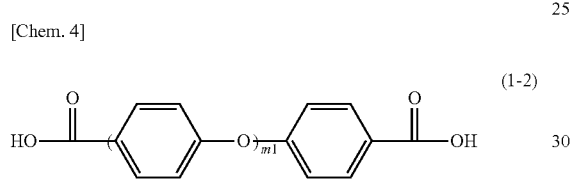

(1-2)

(In the formula, m1 is an integer of any one of 1 to 3.)

[Chem. 5]

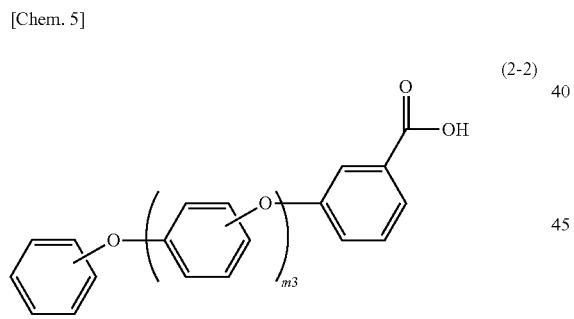

(2-2)

(In the formula, m3 is an integer of any one of 0 to 2.)

[Chem. 6]

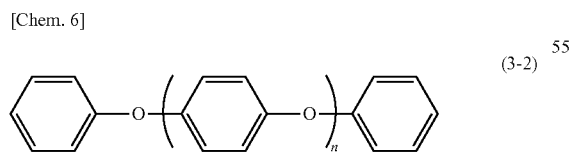

(3-2)

(In the formula, n is an integer of any one of 0 to 2.)

[4] The method for producing the polyarylene ether ketone resin described above in [3], wherein the monomer (1-2) is a monomer (1-2-A) described below, the monomer (2-2) is a monomer (2-2-A) described below, and the monomer (3-2) is a monomer (3-2-A) described below.

[Chem. 7]

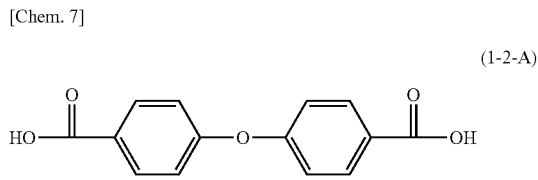

(1-2-A)

[Chem. 8]

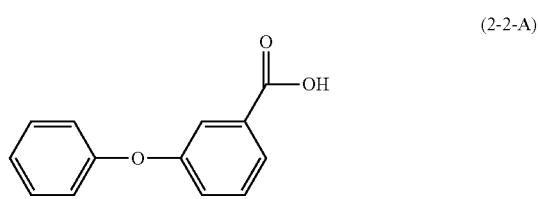 [SMILES: O=C(O)c1cccc(Oc2ccccc2)c1]

(2-2-A)

[Chem. 9]

(3-2-A)

[5] A molded product containing the polyarylene ether ketone resin described above in [1] or [2].

Advantageous Effects of Invention

The present invention can provide a polyarylene ether ketone resin which has excellent heat resistance and a high glass transition temperature and which can be reduced in melting point and also has good moldability and excellent impact resistance. Also, the present invention can provide a production method suitable for producing the polyarylene ether ketone resin.

DESCRIPTION OF EMBODIMENTS

A PAEK resin of the present invention and a method for producing the PAEK resin are described in detail below, but the description of constituent components described below is an example of an embodiment of the present invention, and the present invention is not limited to the contents thereof.

(Polyarylene Ether Ketone Resin (PAEK Resin))

A PAEK resin of the present invention has repeating units represented by general formulae (1-1), (2-1), and (3-1) below.

[Chem. 10]

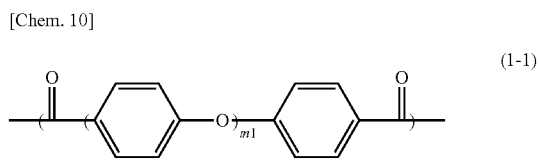

(1-1)

(In the formula, m1 is an integer of any one of 1 to 3.)

[Chem. 11]

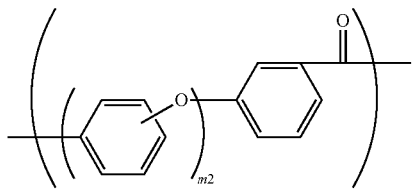

(2-1)

(In the formula, m2 is an integer of any one of 1 to 3.)

[Chem. 12]

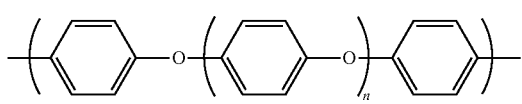

(3-1)

(In the formula, n is an integer of any one of 0 to 2.)

The PAEK resin of the present invention has the repeating units (1-1) and (3-1), which are rigid and tough components, and the repeating unit (2-1), which is a flexible component, and thus the crystal melting point can be controlled by adjusting the ratio of the repeating units (1-1) and (3-1) to the repeating unit (2-1). The PAEK resin of the present invention can be reduced in crystal melting point. The repeating unit (2-1) in the PAEK resin of the present invention has the function of imparting a proper bending structure to the molecular chain of the PAEK resin, and thus is considered to cause a decrease in associating property of the produced polymer. It is thus considered that when the repeating unit (2-1) containing an ether bond is contained at a specific ratio, the produced polymer stays in a solution while maintaining solubility, and thus the termination of molecular growth due to precipitation is prevented. Consequently, the PAEK resin of the present invention shows a high molecular weight, good moldability, and excellent impact resistance.

As described above, the repeating unit (2-1) has the function of imparting a bending structure to the molecular chain of the PAEK resin, and is thus considered to effectively function to decrease the crystal melting point of the PAEK resin.

In the PAEK resin of the present invention, the ratio of the total molar amount of the repeating units (1-1) and (3-1) to the molar amount of the repeating unit (2-1) in terms of molar ratio [(molar amount of repeating unit (1-1)+molar amount of repeating unit (3-1):(molar amount of repeating unit (2-1)] is preferably within a range of 99:1 to 5:95, more preferably within a range of 98:2 to 30:70, and still more preferably within a range of 96:4 to 44:56. The glass transition temperature (Tg) can be adjusted to be high by increasing the ratio of the total molar amount of the repeating units (1-1) and (3-1) to the molar amount of the repeating unit (2-1) within the range described above, and thus the crystallization degree and crystal melting point (Tm) can be increased. Therefore, the PAEK resin having excellent heat resistance can be produced. Also, the crystal melting point (Tm) can be made relatively low by decreasing the ratio of the total molar amount of the repeating unit (1-1) and the repeating unit (3-1) to the molar amount of the repeating unit (2-1) within the range described above, and thus the PAEK resin having excellent moldability and impact resistance can be produced.

The glass transition temperature (Tg) of the PAEK resin of the present invention can be adjusted to 120° C. or more, more preferably 135° C. or more, by adjusting the ratio. More specifically, the glass transition temperature (Tg) can be adjusted to 120° C. to 165° C., preferably 125° C. to 160° C., and more preferably 135° C. to 155° C.

Also, the crystal melting point (Tm) of the PAEK resin of the present invention can be adjusted to 350° C. or less. More specifically, the crystal melting point (Tm) can be adjusted to 250° C. to 350° C., preferably 260° C. to 350° C., and more preferably 265° C. to 349° C.

The PAEK resin having excellent heat resistance, moldability, and impact resistance can be produced by optimizing the ratio of the repeating units (1-1) and (3-1) to the repeating unit (2-1).

(Method for Producing Polyarylene Ether Ketone Resin (PAEK Resin))

In an aspect of the present invention, the method for producing the PAEK resin is a method for producing a PAEK resin including reacting a monomer (1-2) represented by general formula (1-2) below, a monomer (2-2) represented by general formula (2-2) below, and a monomer (3-2) represented by general formula (3-2) below in the presence of organic sulfonic acid and diphosphorus pentoxide.

[Chem. 13]

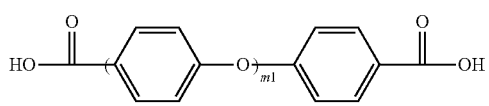

(1-2)

(In the formula, m1 is an integer of any one of 1 to 3.)

[Chem. 14]

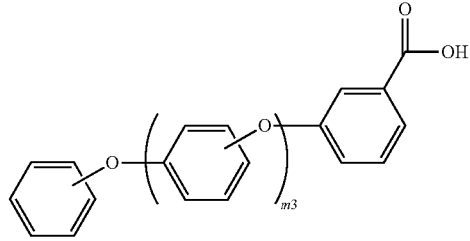

(2-2)

(In the formula, m3 is an integer of any one of 0 to 2.)

[Chem. 15]

(3-2)

(In the formula, n is an integer of any one of 0 to 2.)

Examples of the monomer (1-2) include 4,4'-oxybisbenzoic acid (m1=1), 1,4-bis(4-carboxyphenoxy)benzene (m1=2), and 4,4'-bis(p-carboxyphenoxy)diphenyl ether (m1=3).

Examples of the monomer (2-2) include 3-phexoybenzoic acid (m3=0), 3-(4-phenoxyphenoxy)benzoic acid (m3=1), 3-[4-(4-phenoxyphenoxy)phenoxy]benzoic acid (m3=2), and the like. When m3 is 1 or 2, the bonding positions between an ether group and an aromatic group in phenoxy groups may be each independently any one of the ortho-position, the meta-position, and the para-position, but is generally the para-position, Examples of the monomer (3-2) include diphenyl ether (n=0), 1,4-diphenoxybenzene (n=1), and 4,4'-oxybis(phenoxybenzene) (n=2).

In a preferred embodiment of the present invention, the method for producing the PAEK resin is a method for producing a PAEK resin using a monomer (1-2-A) below in which in the monomer (1-2), m1=1, a monomer (2-2-A) below in which in the monomer, (2-2), m3=0, and a monomer (3-2-A) below in which in the monomer (3-2), n=1.

[Chem. 16]

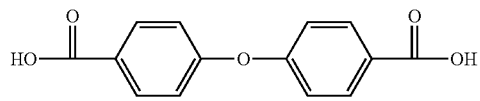

(1-2-A)

[Chem. 17]

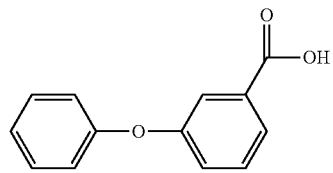

(2-2-A)

[Chem. 18]

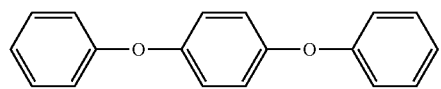

(3-2-A)

The method for producing the PAEK resin of the present invention uses electrophilic aromatic substitution polymerization, and thus reaction can be performed under mild polymerization conditions. Specifically, the PAEK resin can be produced by mixing organic sulfonic acid and diphosphorus pentoxide at 20° C. to 100° C. for 1 to 40 hours, then adding and mixing the monomer (1-2), the monomer (2-2), and the monomer (3-2) with the resultant mixture, and heating the mixture, followed by reaction at 40° C. to 60° C. for 1 to 100 hours at a time.

The organic sulfonic acid is not particularly limited and can be properly selected according to the purpose, and examples thereof include aliphatic sulfonic acid, aromatic sulfonic acid, and the like. Among these, aliphatic sulfonic acid is preferred. More specific examples of organic sulfonic acid include methanesulfonic acid, ethanesulfonic acid, trifluoromethane sulfonic acid, benzenesulfonic acid, p-toluenesulfonic acid (tosic acid), and the like.

The ratio, in terms of ratio by mass, of the amount of organic sulfonic acid added to the amount of diphosphorus pentoxide added is preferably within a range of 100:35 to 100:1, more preferably within a range of 100:30 to 100:5, and still more preferably within a range of 100:25 to 100:5.

The ratio, in terms of ratio by mass, of the total amount of the monomer (1-2), monomer (2-2), and monomer (3-2) added to the total amount of the organic sulfonic acid and diphosphorus pentoxide added is preferably within a range of 1:100 to 50:100, more preferably within a range of 2:100 to 45:100, and still more preferably within a range of 5:100 to 40:100.

When the organic sulfonic acid (for example, particularly, methanesulfonic acid) and diphosphorus pentoxide are used in producing the PAEK resin of the present invention, the PAEK resin having good characteristics can be produced. For example, when an attempt is made to produce the PAEK resin by using anhydrous aluminum chloride in place of the organic sulfonic acid and diphosphorus pentoxide, the polymer sequence is hardly controlled due to the excessively high polymerization rate.

From the viewpoint of increasing the molecular weight, the ratio, in terms of molar ratio, of the amount of the monomer (1-2) added to the amount of monomer (3-2) added in the reaction step is preferably within a range of 85:100 to 115:100, more preferably within a range of 90:100 to 110:100, and particularly preferably within a range of 92:100 to 108:100. In the present invention, for the purpose of decreasing the terminal carboxyl groups of a polymer, an end-capping process of reacting the terminal carboxyl groups with (3-2) can be further provided after the reaction step. The ratio of the amount of (3-2) added in the end-capping process apart from (3-2) added in the reaction step is preferably within a range of 30:100 to 0.1:100, more preferably within a range of 20:100 to 0.5:100, and still more preferably within a range of 15:100 to 1:100, in terms of molar ratio to the total amount of (1-2), (2-2), and (3-2) added in the reaction step.

The ratio, in terms of molar ratio, of the total amount of the monomer (1-2) and monomer (3-2) added to the amount of the monomer (2-2) added is preferably within a range of 99:1 to 5:95, more preferably within a range of 98:2 to 30:70, and still more preferably within a range of 96:4 to 44:56. However, this is not applied to end capping.

<Resin Composition Containing Polyarylene Ether Ketone Resin (PAEK Resin)>

A resin composition can be prepared by combining the PAEK resin of the present invention with another compound.

The other compound is not particularly limited and can be properly selected according to the purpose, and examples thereof include an inorganic filler, an organic filler, and the like.

Examples of the shape of the filler include, but are not particularly limited to, particle-like, plate-like, and fibrous fillers, and the like shape The resin composition containing the PAEK resin more preferably contains a fibrous filler as the filler. In particular, carbon fibers or glass fibers are preferred as the fibrous filler because of a wide range of industrial applications.

<Molded Product Containing Polyarylene Ether Ketone Resin (PAEK Resin)>

The PAEK resin according to the present invention has excellent heat resistance and a high glass transition temperature (Tg), can be reduced in melting point, and also has good moldability and excellent impact resistance. Therefore, the PAEK resin can be used as a neat resin, and compounds such as glass fibers, carbon fibers, a fluorocarbon resin, and the like. Also, molding the PAEK resin according to the present invention can produce primary processed products such as a rod, a board, a film, a filament, and the like; and secondary processed products such as various injection processed products, various cutting processed products, a gear, a bearing, a composite, an implant, a 3D molded product, and the like. These molded products produced by molding the PAEK resin according to the present invention can be used for an automobile, an air craft, an electric/electronic member, a medical member, and the like.

EXAMPLES (Glass Transition Point (Tg) and Crystal Melting Point (Tm))

The glass transition point (Tg) and crystal melting point (Tm) were determined by measurement from 40° C. to 400° C. in a nitrogen stream at 50 mL/min under a heating condition of 20° C./min using a DSC apparatus (Pyris Diamond) manufactured by Perkin Elmer, Inc.

(5% Weight Loss Temperature (Td5 (° C.))

The 5% weight loss temperature was measured by using a TG-DTA apparatus (Rigaku Corporation, TG-8120) in a nitrogen stream at 20 mL/min at a heating rate of 20° C./min.

(Reduced Viscosity (Corresponding to Molecular Weight of PAEK Resin) dL/g)

The outflow time of each of a solvent and a polymer solution prepared by dissolving 0.3 g of a polymer in 100 mL of the solvent was measured at 25° C. by using a Cannon-Fenske viscometer (manufactured by Shibata Scientific Technology Ltd.), and the reduced viscosity was calculated by a formula below. A solution prepared by mixing chloroform and trifluoloacetic acid at a mass ratio of 4:1 was used as the solvent.

$$\text{Reduced viscosity (dL/g)} = (t-t0)/(c \times t0)$$

Herein, t0 represents the outflow time of the solvent, t represents the outflow time of the polymer solution, and c represents the polymer concentration (g/dL) in the polymer solution.

(Measurement of Izod Impact Strength)

The impact strength was measured by using a strip-shaped test piece without a notch (70 mm in length×5 mm in width×2 mm in thickness) according to JISK 7110.

Example 1

In a four-neck separable flask provided with a nitrogen inlet tube, a thermometer, a reflux condenser, and a stirrer, 12.38 g of methanesulfonic acid and 2.97 g of diphosphorus pentoxide were charged, heated to 100° C., and stirred for 4 hours. Then, the resultant mixture was cooled to 80° C., and 1.02 g of 4,4'-oxybisbenzoic acid, 0.09 g of 3-phenoxybenzoic acid, and 1.03 g of 1,4-diphenoxybenzene were charged and reacted for 24 hours. Then, the reaction solution was cooled to room temperature and poured into methanol under strong stirring, precipitating a polymer. Then, the precipitated polymer was filtered off.

Further, the precipitated polymer was washed with methanol two times. Next, the polymer was washed with ion exchange water two times. Then, after solid-liquid separation, the filtered washed cake was dried under vacuum at 180° C. for 10 hours, producing a polymer.

Example 2

In a four-neck separable flask provided with a nitrogen inlet tube, a thermometer, a reflux condenser, and a stirrer, 12.38 g of methanesulfonic acid and 2.97 g of diphosphorus pentoxide were charged, heated to 100° C., and stirred for 4 hours. Then, the resultant mixture was cooled to 80° C., and 1.00 g of 4,4'-oxybisbenzoic acid, 0.19 g of 3-phenoxybenzoic acid, and 0.68 g of 1,4-diphenoxybenzene were charged and reacted for 24 hours. Then, the reaction solution was cooled to room temperature and poured into methanol under strong stirring, precipitating a polymer. Then, the precipitated polymer was filtered off.

Further, the precipitated polymer was washed with methanol two times. Next, the polymer was washed with ion exchange water two times. Then, after solid-liquid separation, the filtered washed cake was dried under vacuum at 180° C. for 10 hours, producing a polymer.

Example 3

In a four-neck separable flask provided with a nitrogen inlet tube, a thermometer, a reflux condenser, and a stirrer, 128.88 g of methanesulfonic acid and 30.93 g of diphosphorus pentoxide were charged, heated to 100° C., and stirred for 8 hours. Then, the resultant mixture was cooled to 80° C., and 13.296 g of 4,4'-oxybisbenzoic acid, 4.902 g of 3-phenoxybenzoic acid, and 13.506 g of 1,4-diphenoxybenzene were charged and reacted for 17 hours. Then, 1.501 g of 1,4-diphenoxybenzene was charged and reacted for 23 hours. Then, the reaction solution was cooled to room temperature and poured into methanol under strong stirring, precipitating a polymer. Then, the precipitated polymer was filtered off.

Further, the precipitated polymer was washed with methanol two times. Next, the polymer was washed with ion exchange water two times. Then, after solid-liquid separation, the filtered washed cake was dried under vacuum at 180° C. for 10 hours, producing a polymer.

Example 4

In a four-neck separable flask provided with a nitrogen inlet tube, a thermometer, a reflux condenser, and a stirrer, 128.88 g of methanesulfonic acid and 30.93 g of diphosphorus pentoxide were charged, heated to 100° C., and stirred for 5 hours. Then, the resultant mixture was cooled to 80° C., and 10.834 g of 4,4'-oxybisbenzoic acid, 8.988 g of 3-phenoxybenzoic acid, and 11.005 g of 1,4-diphenoxybenzene were charged and reacted for 17 hours. Then, 1.376 g of 1,4-diphenoxybenzene was charged and reacted for 23 hours. Then, the reaction solution was cooled to room temperature and poured into methanol under strong stirring, precipitating a polymer. Then, the precipitated polymer was filtered off.

Further, the precipitated polymer was washed with methanol two times. Next, the polymer was washed with ion exchange water two times. Then, after solid-liquid separation, the filtered washed cake was dried under vacuum at 180° C. for 10 hours, producing a polymer.

Example 5

In a four-neck separable flask provided with a nitrogen inlet tube, a thermometer, a reflux condenser, and a stirrer, 12.38 g of methanesulfonic acid and 2.97 g of diphosphorus pentoxide were charged, heated to 100° C., and stirred for 4 hours. Then, the resultant mixture was cooled to 80° C., and 0.67 g of 4,4'-oxybisbenzoic acid, 1.48 g of 3-phenoxybenzoic acid, and 0.68 g of 1,4-diphenoxybenzene were charged and reacted for 24 hours. Then, the reaction solution was cooled to room temperature and poured into methanol under strong stirring, precipitating a polymer. Then, the precipitated polymer was filtered off.

Further, the precipitated polymer was washed with methanol two times. Next, the polymer was washed with ion exchange water two times. Then, after solid-liquid separation, the filtered washed cake was dried under vacuum at 180° C. for 10 hours, producing a polymer.

Example 6

In a four-neck separable flask provided with a nitrogen inlet tube, a thermometer, a reflux condenser, and a stirrer, 12.29 g of methanesulfonic acid and 2.95 g of diphosphorus pentoxide were charged, heated to 100° C., and stirred for 4 hours. Then, the resultant mixture was cooled to 80° C., and 1.03 g of 4,4'-oxybisbenzoic acid, 0.86 g of 3-phenoxybenzoic acid, and 1.05 g of 1,4-diphenoxybenzene were charged and reacted for 17 hours. Then, the reaction solution was cooled to room temperature and poured into methanol under strong stirring, precipitating a polymer. Then, the precipitated polymer was filtered off.

Further, the precipitated polymer was washed with methanol two times. Next, the polymer was washed with ion exchange water two times. Then, after solid-liquid separation, the filtered washed cake was dried under vacuum at 180° C. for 10 hours, producing a polymer.

The glass transition temperature (Tg), crystal melting point (Tm), 5% weight loss temperature (Td5 (° C.)), reduced viscosity (dL/g), and Izod impact strength of the PAEK resin of each of Examples 1 to 6 were measured, and the results are shown in Table 1-1. The polymers of Examples 5 and 6 were amorphous polymers not having a clear melting point.

Comparative Example 1

In a four-neck separable flask provided with a nitrogen inlet tube, a thermometer, a reflux condenser, and a stirrer, 12.38 g of methanesulfonic acid and 2.97 g of diphosphorus pentoxide were charged, heated to 100° C., and stirred for 4 hours. Then, the resultant mixture was cooled to 80° C., and 2.63 g of 3-phenoxybenzoic acid was charged and reacted for 24 hours. Then, the reaction solution was cooled to room temperature and poured into methanol under strong stirring, precipitating a polymer. Then, the precipitated polymer was filtered off.

Further, the precipitated polymer was washed with methanol two times. Next, the polymer was washed with ion exchange water two times. Then, after solid-liquid separation, the filtered washed cake was dried under vacuum at 180° C. for 10 hours, producing a polymer. The glass transition temperature (Tg), crystal melting point (Tm), 5% weight loss temperature (Td5 (° C.)), reduced viscosity (dL/g), and Izod impact strength of the PAEK resin of Comparative Example 1 were measured, and the results are shown in Table 1-2. The polymer of Comparative Example 1 was an amorphous polymer not having a clear melting point.

Comparative Example 2

VICTREX PEEK 150P manufactured by Victrex Ltd. was prepared as a PEEK resin of Comparative Example 2, and the glass transition temperature (Tg), crystal melting point (Tm), 5% weight loss temperature (Td5 (° C.)), reduced viscosity (dL/g), and Izod impact strength of the PEEK resin were measured, and the results are shown in Table 1-2.

Comparative Example 3

VICTREX HT manufactured by Victrex Ltd. was prepared as a PEK resin of Comparative Example 3, and the glass transition temperature (Tg), crystal melting point (Tm), 5% weight loss temperature (Td5 (° C.)), reduced viscosity (dL/g), and Izod impact strength of the PEK resin were measured, and the results are shown in Table 1-2.

Comparative Example 4

In a four-neck separable flask provided with a nitrogen inlet tube, a thermometer, a reflux condenser, and a stirrer, 818 g of methanesulfonic acid and 82 g of diphosphorus pentoxide were charged and stirred in a nitrogen atmosphere at room temperature for 20 hours. Then, 12.4 g of isophthalic acid and 42.5 g of diphenyl ether were charged, heated to 60° C., and then reacted for 10 hours. Then, 45.1 g of 4,4'-oxybisbenzoic acid was added and further reacted for 40 hours. Then, the reaction solution was cooled to room temperature and poured into methanol under strong stirring, precipitating a polymer which was then filtered off. Further, the polymer was washed with methanol two times. Next, the polymer was washed with ion exchange water two times. Then, the polymer was dried under vacuum at 180° C. for 10 hours, producing a polymer.

The glass transition temperature (Tg), crystal melting point (Tm), 5% weight loss temperature (Td5 (° C.)), reduced viscosity (dL/g), and Izod impact strength of the PAEK resin of Comparative Example 4 were measured, and the results are shown in Table 1-2.

TABLE 1-1

|  |  |  | Example 1 | Example 2 | Example 3 | Example 4 | Example 5 | Example 6 |
|---|---|---|---|---|---|---|---|---|
| Composition | Repeating unit (1-1) | mol % | 48 | 45 | 41 | 33 | 31 | 22 |
|  | Repeating unit (2-1) | mol % | 4 | 10 | 18 | 33 | 38 | 56 |
|  | Repeating unit (3-1) | mol % | 48 | 45 | 41 | 33 | 31 | 22 |
| Properties | Tg | ° C. | 148 | 146 | 142 | 140 | 141 | 139 |
|  | Tm | ° C. | 340 | 329 | 320 | 280 | — | — |
|  | Td5 | ° C. | 552 | 553 | 550 | 547 | 552 | 543 |
|  | Reduced viscosity | dL/g | 1.1 | 1.2 | 1.2 | 1.3 | 1.1 | 1.0 |
|  | Izod impact strength - without notch | kJ/m$^2$ | 110 | 111 | 113 | 115 | 110 | 108 |

TABLE 1-2

| | | | Comparative Example 1 | Comparative Example 2 | Comparative Example 3 | Comparative Example 4 |
|---|---|---|---|---|---|---|
| Composition | Repeating unit (1-1) | mol % | 0 | PEEK resin | PEK resin | 70 |
| | Repeating unit (2-1) | mol % | 100 | | | 30 |
| | Repeating unit (3-1) | mol % | 0 | | | 100 |
| Properties | Tg | °C. | 133 | 143 | 153 | 144 |
| | Tm | °C. | — | 343 | 373 | 319 |
| | Td5 | °C. | 510 | 550 | 545 | 532 |
| | Reduced viscosity | dL/g | 0.9 | 1.2 | 1.2 | 1.2 |
| | Izod impact strength - without notch | kJ/m² | 70 | 117 | 119 | 50 |

In Table 1-2, the repeating unit (2-1) of Comparative Example 4 is replaced by isophthalic acid as a repeating unit in terms of mol %.

Table 1-1 indicates that the PAEK resin of each of the examples can be adjusted to have a glass transition temperature (Tg) of 135° C. or more and is a resin having excellent heat resistance equivalent to the commercial PEEK resin (Comparative Example 2) and PEK resin (Comparative Example 3). It was also found that the PAEK resin of each of the examples can be controlled to have a crystal melting point (Tm) of 340° C. or less while maintaining excellent heat resistance, and has good moldability because the crystal melting point (Tm) is lower than the crystal melting point (Tm) (373° C.) of the commercial PEEK resin (Comparative Example 2) and PEK resin (Comparative Example 3). Further, the PAEK resin has impact strength equivalent to those of the PEEK resin (Comparative Example 2) and PEK resin (Comparative Example 3), and also has excellent impact resistance because of the increased ratio of ether bond as compared with Comparative Example 4. Further, it was found that the PAEK resin of Comparative Example 1 not having the repeating units (1-1) and (3-1) have lower values of the glass transition temperature (Tg) and 5% weight loss temperature (Td5) and thus has poor heat resistance as compared with the PAEK resins of the examples.

The present application claims priority based on Japanese Patent Application No, 2019-136053 filed on Jul. 24, 2019, and the entire contents described in the Japanese Patent Application are incorporated therein.

The invention claimed is:

1. A method for producing the polyarylene ether ketone resin, the method comprising reacting a monomer (1-2) represented by general formula (1-2) below, a monomer (2-2-A) represented by general formula (2-2-A) below, and a monomer (3-2) represented by general formula (3-2) below in the presence of methanesulfonic acid and diphosphorus pentoxide,

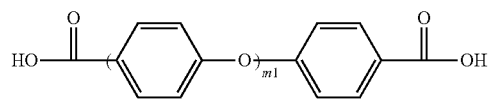
(1-2)

in the formula, m1 is an integer of any one of 1 to 3)

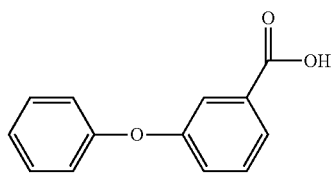
(2-2-A)

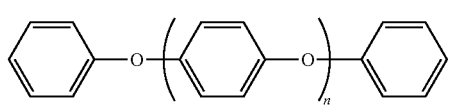
(3-2)

(in the formula, n is an integer of any one of 0 to 2), wherein the polyarylene ether ketone resin produced by the method has a crystal melting point (Tm) of 340° C. or less, and the polyarylene ether ketone resin produced by the method has a glass transition point (Tg) of 140° C. or higher.

2. The method for producing the polyarylene ether ketone resin according to claim 1, wherein the monomer (1-2) is a monomer (1-2-A) below, and the monomer (3-2) is a monomer (3-2-A) below,

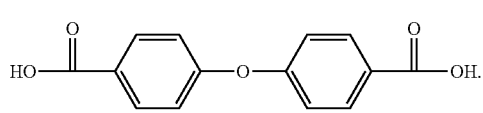
(1-2-A)

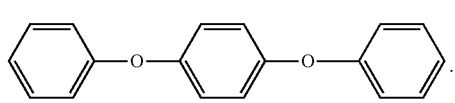
(3-2-A)

3. A method for producing the polyarylene ether ketone resin, the method comprising reacting a monomer (1-2) represented by general formula (1-2) below, 3-(4-phenoxyphenoxy)benzoic acid, and a monomer (3-2) represented by general formula (3-2) below in the presence of methanesulfonic acid and diphosphorus pentoxide,

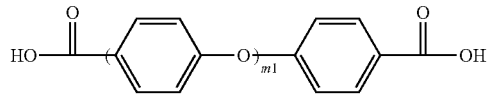

(in the formula, m1 is an integer of any one of 1 to 3)

(in the formula, n is an integer of any one of 0 to 2), wherein
the polyarylene ether ketone resin produced by the method has a crystal melting point (Tm) of 340° C. or less, and
the polyarylene ether ketone resin produced by the method has a glass transition point (Tg) of 140° C. or higher.

4. A method for producing the polyarylene ether ketone resin, the method comprising reacting a monomer (1-2) represented by general formula (1-2) below, 3-[4-(4-phenoxyphenoxy) phenoxy] benzoic acid, and a monomer (3-2) represented by general formula (3-2) below in the presence of methanesulfonic acid and diphosphorus pentoxide,

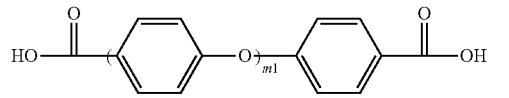

(in the formula, m1 is an integer of any one of 1 to 3)

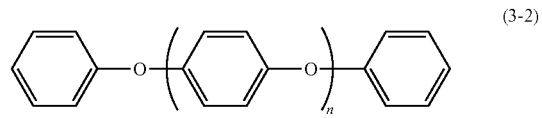

(in the formula, n is an integer of any one of 0 to 2), wherein
the polyarylene ether ketone resin produced by the method has a crystal melting point (Tm) of 340° C. or less, and
the polyarylene ether ketone resin produced by the method has a glass transition point (Tg) of 140° C. or higher.

* * * * *